United States Patent
Gericke et al.

(10) Patent No.: US 12,372,176 B2
(45) Date of Patent: Jul. 29, 2025

(54) DEVICE FOR RECEIVING AND/OR CONDUCTING BULK MATERIALS AND/OR POWDERS WITH A FLANGE CONNECTION DEVICE, AND SEALING ELEMENT

(71) Applicant: Gericke AG, Regensdorf (CH)

(72) Inventors: Markus H. Gericke, Zollikon (CH); Frank Lauer, Rauenberg (CH); Reto Schaffner, Weiningen (CH)

(73) Assignee: Gericke AG, Regensdorf (CH)

( * ) Notice: Subject to any disclaimer, the term of this patent is extended or adjusted under 35 U.S.C. 154(b) by 0 days.

(21) Appl. No.: 18/345,592

(22) Filed: Jun. 30, 2023

(65) Prior Publication Data
US 2024/0003472 A1 Jan. 4, 2024

(30) Foreign Application Priority Data
Jul. 1, 2022 (EP) ..................................... 22182673

(51) Int. Cl.
*F16L 23/18* (2006.01)
*F16J 15/06* (2006.01)

(52) U.S. Cl.
CPC ............. *F16L 23/18* (2013.01); *F16J 15/061* (2013.01); *F16J 15/062* (2013.01)

(58) Field of Classification Search
CPC ....... F16L 17/06; F16L 17/067; F16L 23/032; F16L 23/18; F16L 23/20; F16L 23/22;
(Continued)

(56) References Cited

U.S. PATENT DOCUMENTS 448,765 A * 3/1891 Kaiser ..................... F16L 27/00
285/119
1,272,267 A * 7/1918 Horton ................ F16L 25/0018
285/423
(Continued)

FOREIGN PATENT DOCUMENTS

EP 2792916 A1 10/2014
FR 2835587 A1 8/2003

OTHER PUBLICATIONS

Extended European Search Report mailed Nov. 28, 2022 issued in corresponding European Patent Application No. 22182673.8 (and English translation).
(Continued)

*Primary Examiner* — Nicholas L Foster
(74) *Attorney, Agent, or Firm* — Posz Law Group, PLC

(57) ABSTRACT

A device has a flange including a base body with a main contact face and a further flange including a further base body with a further main contact face. In a mounted state the flange is connected to the further flange with a sealing element therebetween. The flange has a recess which adjoins the main contact face and in which the sealing element is arranged. The further flange has an extension which protrudes from the further base body at the further main contact face and engages in the recess and contacts the sealing element. The extension positions and centers the sealing element and/or compresses the sealing element. The flange and the further flange jointly delimit a groove which forms part of the recess and partially receives the sealing element, and a groove width increases from an opening of the groove to a low point of the groove.

7 Claims, 4 Drawing Sheets

Figure 1:
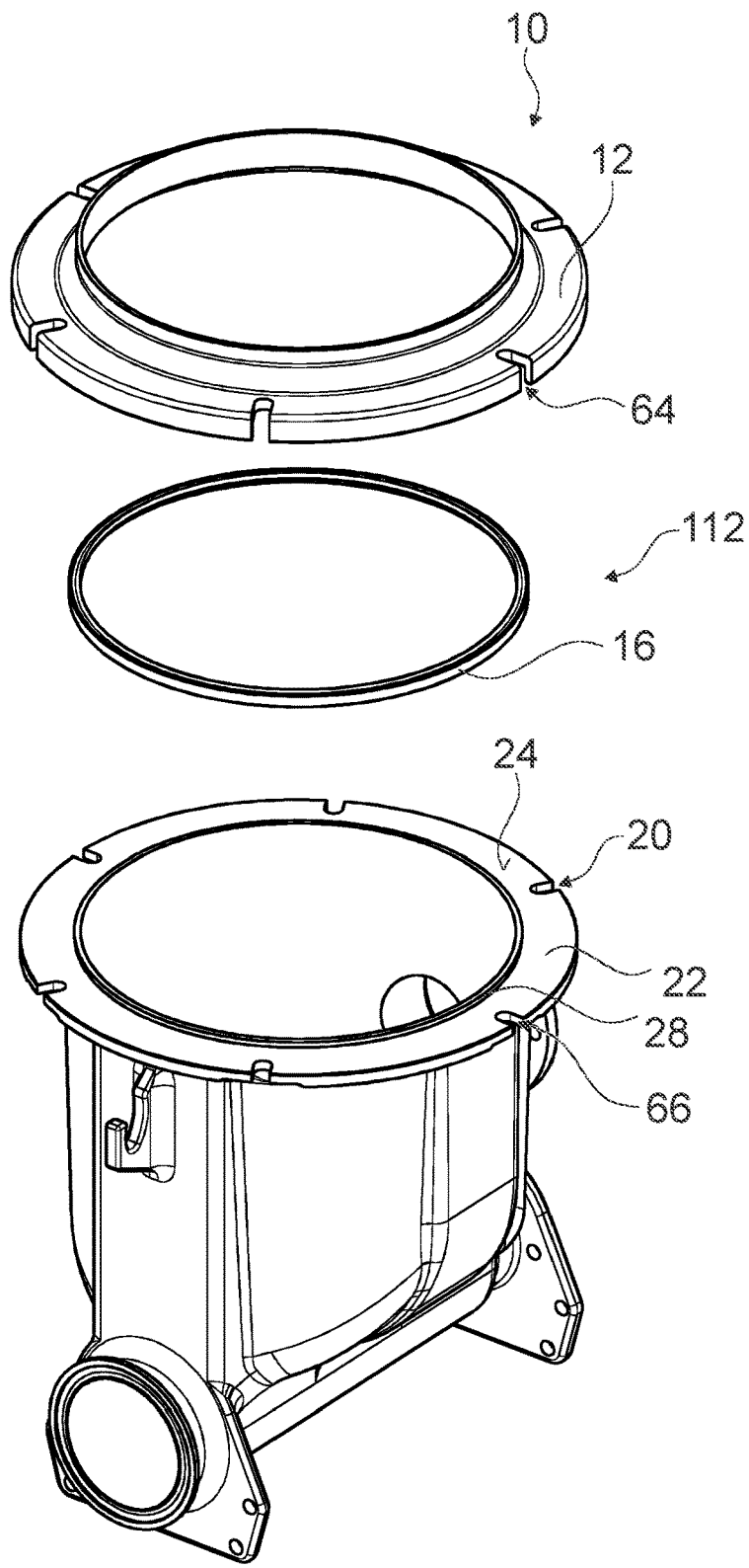

(58) Field of Classification Search
CPC ..... F16L 2201/44; F16J 15/061; F16J 15/062; F16J 15/106
See application file for complete search history.

(56) References Cited

U.S. PATENT DOCUMENTS

| | | | | |
|---|---|---|---|---|
| 2,780,483 | A * | 2/1957 | Kessler | F16L 19/0218 |
| | | | | 285/354 |
| 3,161,318 | A * | 12/1964 | Krueger | F16J 15/0887 |
| | | | | 220/378 |
| 3,620,556 | A | 11/1971 | Paddington | |
| 3,854,761 | A * | 12/1974 | David | F16K 27/08 |
| | | | | 277/648 |
| 4,303,251 | A * | 12/1981 | Harra | F16J 15/0881 |
| | | | | 277/614 |
| 4,570,983 | A * | 2/1986 | Olenfalk | F16L 41/086 |
| | | | | 285/212 |
| 5,029,878 | A * | 7/1991 | Ray | F04D 29/086 |
| | | | | 277/643 |
| 5,466,018 | A * | 11/1995 | Stobbart | F16L 23/167 |
| | | | | 277/614 |
| 5,904,382 | A | 5/1999 | Bronnert | |
| 6,045,033 | A * | 4/2000 | Zimmerly | F16L 23/08 |
| | | | | 228/171 |
| 6,073,969 | A * | 6/2000 | Zimmerly | F16L 23/22 |
| | | | | 285/12 |
| 6,234,545 | B1 * | 5/2001 | Babuder | F16L 23/22 |
| | | | | 285/364 |
| 8,007,011 | B2 * | 8/2011 | Muzzo | F16L 23/22 |
| | | | | 285/212 |
| 9,249,909 | B2 * | 2/2016 | Ikushima | F16K 27/02 |
| 9,671,021 | B2 * | 6/2017 | Branchet-Cohen | F16J 15/06 |
| 10,641,394 | B2 * | 5/2020 | Uhlenkamp | F16L 17/06 |
| 11,572,951 | B2 * | 2/2023 | Adachi | F16J 15/104 |
| 11,644,129 | B2 * | 5/2023 | Uhlenkamp | F16L 21/02 |
| | | | | 277/614 |
| 2009/0179388 | A1 * | 7/2009 | Uhlenkamp | F16L 23/22 |
| | | | | 277/612 |
| 2014/0252765 | A1 | 9/2014 | Branchet-Cohen et al. | |
| 2014/0375051 | A1 * | 12/2014 | Ikushima | F16L 23/22 |
| | | | | 285/363 |
| 2015/0054276 | A1 * | 2/2015 | Alsup | F16L 23/18 |
| | | | | 285/368 |
| 2023/0129427 | A1 * | 4/2023 | Eitzenberger | F16L 23/032 |
| | | | | 277/608 |

OTHER PUBLICATIONS

Office Action dated Mar. 19, 2025 issued in the corresponding European Patent Application No. 22182673.8 (and English translation).

* cited by examiner

DEVICE FOR RECEIVING AND/OR CONDUCTING BULK MATERIALS AND/OR POWDERS WITH A FLANGE CONNECTION DEVICE, AND SEALING ELEMENT

CROSS-REFERENCE TO RELATED APPLICATION

This patent application is based on and incorporates herein by reference European Patent Application No. 22182673.8 filed on Jul. 1, 2022.

PRIOR ART

The invention concerns a device for receiving and/or conducting bulk materials and/or powders, with a flange connection device and a sealing element.

A flange connection device is already known having a flange comprising a base body with a main contact face, with a further flange comprising a further base body with a further main contact face, wherein in mounted state the flange is connected to the further flange, and with a sealing element which in mounted state is arranged between the flange and the further flange.

The object of the invention is in particular to provide a generic device with improved properties with respect to flange precision. The object is achieved according to the invention.

ADVANTAGES OF THE INVENTION

The invention is based on a device for receiving and/or conducting bulk materials and/or powders, with a flange connection device with a flange comprising a base body with a main contact face, with a further flange comprising a further base body with a further main contact face, wherein in mounted state the flange is connected to the further flange in particular by force fit and/or form fit, and with a sealing element which in mounted state is arranged between the flange and the further flange.

It is proposed that the flange has a recess which adjoins the main contact face and in which the sealing element is at least partially, preferably completely arranged in mounted state, and that the further flange has an extension which protrudes from the further base body at the further main contact face and in mounted state engages at least partially and/or at least section-wise (of the periphery) in the recess and in mounted state contacts the sealing element, wherein the extension is configured for positioning and centering of the sealing element and/or for defined, preferably dead-space-free, compression of the sealing element, wherein the flange and the further flange jointly delimit a groove which forms part of the recess and is configured to partially receive the sealing element, and wherein a groove width of the groove increases at least region-wise starting from an opening of the groove as far as a low point of the groove. Thus advantageously a particularly high flange precision can be achieved. Advantageously, a particularly precise seat of two interconnected flanges relative to one another can be achieved. Advantageously, a particularly precise seat of a flange seal can be achieved particularly easily. Advantageously, a simple and at the same time securely tight mounting of the flanges on one another is possible. In particular, a "flange" means a connecting element for connecting an opening and/or a conduit to a further opening and/or conduit. In particular, a flange may have a round, oval or other enclosed e.g. polygonal form. In particular, the flange connecting device seals an inner face/an interior space formed by the flanges. In particular, the flange connection device is configured to conduct bulk materials and/or powders. For example, the flange may have a cylindrical inner face and the further flange may have a further cylindrical inner face, wherein the cylindrical inner face and the further cylindrical inner face may be oriented parallel with one another. In particular, the flange connection device reliably seals the interior space also when a positive pressure or a reduced pressure prevails in the interior space. In particular, the flange may be formed as a separate component or integrally or as one piece with a component comprising the opening and/or the conduit. "Integrally" in particular means connected at least by substance bonding, for example by a welding process, an adhesive process, a molding process and/or another process which the person skilled in the art deems suitable, and/or advantageously formed in one piece such as for example by production from a casting and/or by production in a single- or multi-component injection molding process, and advantageously from a single blank. In particular, the flange connection device is configured for releasable, preferably non-destructively releasable and/or repeatedly closable connection of conduits and/or openings. The device for receiving and/or conducting bulk materials and/or powders comprises at least the flange connection device configured for conducting bulk materials and/or powders. In addition, the device may comprise further containers, conduits or similar, for example a feeding system.

In particular, the two flanges are configured to be fixedly connected to each other, for example by clamping, screwing, riveting, press-fitting or similar. In particular, the flanges are connected to each other such that main contact faces of the interconnected flanges, in particular in mounted state, are at least to a majority, preferably completely, in superficial touch contact with one another. "A majority" in this context means in particular 60%, preferably 80% and particularly preferably 95%. "Configured" means in particular specially programmed, designed and/or equipped. The phrase that an object is configured for a specific function in particular means that the object fulfils and/or executes this specific function in at least one application and/or operating state.

In particular, the sealing element is configured to create or at least substantially improve a tightness of the connection of the two flanges, in particular against bulk materials and/or powders. In particular, the sealing element is made of a plastic, e.g. an elastomer. In particular, the sealing element is made of a material for which the EHEDG (European Hygienic Engineering and Design Group) Guidelines permit wet cleaning and dry cleaning. Preferably, the sealing element is made of an ethylene-propylene-diene-M group (EPDM) rubber such as EPDM-291. Alternatively or additionally, the sealing element may be made from a metallic and/or electromagnetically detectable material. In particular, the flange and/or the further flange are made of a metal. Alternatively however, the flange may conceivably also be made of a plastic or composite material. In particular, the sealing element is elastically deformable. In particular, the sealing element is configured to be compressed between the flanges when the two flanges are mounted against one another. In particular, the sealing element is formed without mold separation lines at least in the main sealing regions (the inner face of the regions facing the flanges). In particular, the sealing element has a form which, in conjunction with the outer forms of the flanges, creates a self-centering. In particular, the seal which can be achieved by the two flanges and the sealing element is at least substantially free from dead spaces. Thus advantageously, a proliferation of germs or fungi in the flange region can be prevented. Advantageously, the cleanability by dry cleaning and/or wet cleaning can be substantially simplified and/or improved by the seal/connection without dead spaces. A cleaning process on a concave to cylindrical sealing surface advantageously fulfils the requirements imposed for CIP (cleaning in place) and/or SIP (sterilization in place). In particular, the sealing element is round, oval or has an alternative closed e.g. polygonal form. In particular, the form of the sealing element follows a form of the interior space of the flange connection device.

In particular, the recess is formed as a shoulder lying between the main contact face of the flange and the inner face of the flange and extending in a direction pointing away from the further flange. In particular, the recess is delimited by the flange in a direction pointing away from the further flange/in a direction pointing opposite a normal direction to the main contact face of the flange. In particular, the recess has no delimitation in a direction pointing towards the further flange/in a direction pointing in the normal direction to the main contact face of the flange. In particular, the recess is delimited by the flange in a direction pointing away from the inner face of the flange/in a direction pointing away from an interior space of the flange connection device to be sealed by the flange. In particular, the recess has no delimitation in a direction pointing towards the inner face of the flange/in a direction pointing towards an interior space of the flange connection device to be sealed by the flange. In particular, the recess is delimited by the flange in at least two spatial directions at each point/in each vertical sectional view of the flange. In particular, the recess is delimited by the flange in maximum two spatial directions at each point/in each vertical sectional view of the flange. In particular, the recess extends in the circumferential direction around the entire flange. In particular, the flange and the further flange are realized/formed so as to be complementary to one another. In particular, at least one of the delimiting faces of the recess contacts the sealing element in mounted state. Preferably, all delimitation faces of the recess contact the sealing element in mounted state. In particular, at least one of the delimiting faces of the recess exerts a compression force on the sealing element in mounted state. Preferably, all delimiting faces of the recess exert compression forces on the sealing element in mounted state.

In particular, the extension is formed as a shoulder lying between the main contact face of the further flange and an inner face of the further flange and extending in a direction pointing towards the flange. In particular, the extension protrudes from the base body of the further flange in a direction pointing towards the flange. In particular, the extension has at least two substantially vertically extending side walls in all vertical sectional views. In particular, the delimitation lines forming the two vertically extending side walls run at an angle to one another or non-parallel in the vertical sectional view. In particular, a vertical direction of the flange and/or the further flange extends parallel to an axial direction of interior openings of the flange/parallel to an axial direction of a flange opening/flange channel connecting the flanges. In particular, at least one delimitation face of the extension contacts the sealing element in mounted state. Preferably, at least two delimitation faces of the extension contact the sealing element in mounted state. Preferably, at least one delimitation face of the extension, in particular a delimitation face of the extension facing the interior space of the flange connection device, has no contact with the sealing element. In particular, at least one delimitation face of the extension exerts a compression force on the sealing element in mounted state. In particular, at least two delimitation faces of the extension exert compression forces on the sealing element in mounted state. In particular, a part region of the sealing element which, in mounted state of the flange connection device, lies on a delimitation face of the extension facing the flange and/or lying in a plane parallel to the main contact face of the further flange, in particular its material thickness and/or material properties such as elasticity properties, are configured for setting a defined compression of sealing element. In particular, the delimitation face of the extension lying opposite a delimitation face of the extension facing the interior space/inner face of the flange connection device/flange is configured for centering the sealing element, in particular in that it is formed at an angle to the axial direction. In particular, the extension widens in a direction pointing away from the further flange.

In particular, the sealing element, in particular in a compressed and in an uncompressed state, preferably in mounted state and in unmounted state, has an L-shaped (vertical) cross-section. In particular, the L-shaped sealing element has two legs lying at least substantially at right angles to one another in the (vertical) cross-sectional view. In particular, the L-shaped sealing element in cross-sectional view has a leg which is configured to lie/be compressed between two faces of the flange lying opposite one another in the axial direction of the flange/interior space of the flange connection device. The leg is configured for setting a defined compression. In particular, the L-shaped sealing element in cross-sectional view comprises a further leg which is configured to lie/be compressed between two faces of the flange lying opposite one another at least substantially vertically to the axial direction of the flange/interior space of the flange connection device. The further leg is configured for setting the centering. In particular, an "L-shaped" cross-section means a preferably vertical cross-section through the sealing element which at least resembles a Latin capital letter L.

Because the flange and the further flange together delimit a groove which forms part of the recess and is configured to partially receive the sealing element, advantageously a simple centering, in particular a self-centering, of the flanges relative to one another, can be achieved via the sealing element, in particular excluding a dead space. In particular, in the vertical cross-sectional view, the groove is delimited by the flanges in the radial direction of the flanges/in directions perpendicular to the axial direction of the flanges. In particular, in vertical cross-sectional view, the groove is open on one side in the axial direction of the flanges. In particular, a channel also delimited by the flanges adjoins an opening of the groove and connects the groove to the interior space of the flange connection device/interior space to be sealed by flanges. In particular, the groove is not open directly to the interior space of the flange connection device/interior space to be sealed by the flanges. Alternatively, it is conceivable that the entire groove is formed by only one of the two flanges, whereby the self-centering effect could be reduced. In particular, in correctly mounted and centered state, the groove comprises at least one tenth, preferably at least one seventh and preferably at least one fifth of the recess. In particular, in correctly mounted and centered state, the groove comprises at most one half, preferably at most one third and preferably at least one quarter of the recess. In particular, in mounted state, the groove is delimited by the flange, in particular the flange forming the recess, to at least 10%, preferably at least 20% and preferably at least 30%. In particular, in mounted state, the groove is delimited by the flange, in particular the flange forming the recess, to maximum 50%, preferably maximum 40% and preferably maximum 30%. In particular, in mounted state, the groove is delimited by the further flange, in particular the flange forming the extension, to at least 50%, preferably at least 60% and preferably at least 30%. In particular, in mounted state, the groove is delimited by the further flange, in particular the flange forming the extension, to maximum 90%, preferably maximum 80% and preferably maximum 70%. In particular, in cross-sectional view, the groove has the shape of a triangle cut in an upper half.

If the groove width widens at least region-wise, starting from a groove opening to a low point of the groove, an advantageous self-centering effect may be achieved. In particular, the groove at the low point is at least 10%, preferably at least 20% and preferably at least 30% wider than the opening of the groove. In particular, the groove at the low point is maximum 100%, preferably maximum 50% wider than the opening of the groove. In particular, the form of the groove is configured to create in targeted fashion a concave compression of the sealing element.

Because the sealing element has a leg which is configured to engage by form-fit in the groove, wherein the sealing element is configured to be arranged self-retainingly in the groove by means of the leg, advantageously an overhead mounting can be significantly simplified. In particular, the leg of the sealing element has a form which widens, in particular starting from a bend point/apex of the sealing element, and is configured to engage in the groove which widens starting from the groove opening. In particular, the leg and the further leg, at least on an inside of the L-shaped cross-section, span an angle of less than 90°, for example around 80°. In particular, an inner diameter of the sealing element is smaller in the region of a end of the leg than in the region of the start of the leg. "Self-retaining" in particular means that the sealing element cannot become detached from the further flange purely by gravity acting on the sealing element. In particular, the leg of the sealing element is configured to assume a form fit with the further flange, in particular with the extension of the further flange.

It is also proposed that the recess forms a flank of the base body of the flange, which extends into the groove from the main contact face of the flange, wherein a maximal axial extent of the flank is greater than a maximal axial extent of the sealing element, in particular in uncompressed state. Thus advantageously a particularly high flange precision can be achieved. In particular, on joining of the flanges, the sealing element, in particular the further leg of the sealing element, is compressed such that the leg is pressed into the groove. In particular, after joining of the flanges, the pressed-in leg completely fills the groove.

If the flange, sealing element and further flange in mounted state, in particular in a connecting region, have a same minimal distance from a common center axis, advantageously a particularly high flange precision can be achieved.

It is also proposed that the flange connection device has an interior space which is configured as a conduit for a bulk material and/or powder, wherein the flange, the sealing element and the further flange in mounted state are connected to each other with no dead space against the interior space. Thus advantageously a particularly good hygiene can be achieved. Advantageously, in this case the interior space may be used as a conduit for a foodstuff or a chemical with high purity.

If also an inner face of the sealing element in mounted state is arranged flush with an, in particular cylindrical, inner face of the flange and with a further, in particular cylindrical, inner face of the further flange, advantageously a good hygiene can be achieved, in particular by avoidance of dead spaces.

It is furthermore intended that the main contact face and the further main contact face contact one another in mounted state. Thus, advantageously, a particularly firm and/or secure seat of the flanges on/against one another can be achieved.

If also an in particular maximal outer diameter of the flange in a region of the main contact face is at least substantially the same size as a further, in particular maximal outer diameter of the further flange in a region of the further main contact face, a simple checking of the centering from the outside can be guaranteed. Thus high hygiene can be guaranteed also during longer periods of operation. Alternatively however, also a mutually different maximal outer diameter is conceivable. For example, one of the two flanges may also be bent on the outer diameter and thereby overlap the other flange.

It is also proposed that the flange has an inner diameter which corresponds to at least DN 200, preferably at least DN 300. Thus advantageously a high through-flow can be achieved. In particular, advantageously a flange connection device with a high through-flow quantity and also a good hygiene level can be achieved.

Furthermore, a sealing element of the flange connection device is proposed which advantageously can guarantee a high flange precision and/or good hygiene.

The flange connection device according to the invention and the sealing element according to the invention are not restricted here to the above-described application and embodiment. In particular, the flange connection device according to the invention and the sealing element according to the invention may have a number of individual elements, components and units differing from the number cited herein, in order to fulfil one of the functions described herein.

DRAWINGS

Further advantages become clear from the following description of the drawings. The drawings illustrate an exemplary embodiment of the invention. The drawings, the description and the claims contain numerous features in combination. The person skilled in the art will suitably also consider the features individually and combine them into further suitable combinations.

Figure 2:
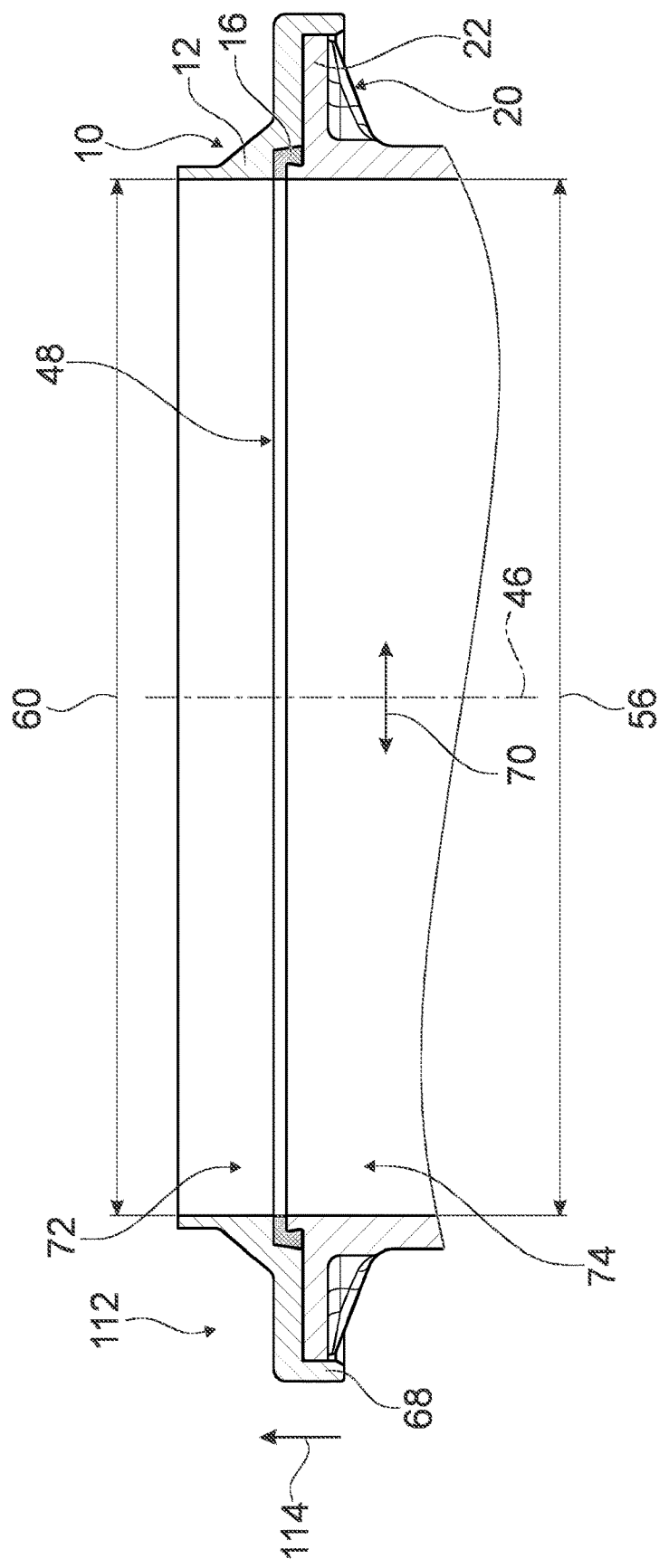
Figure 3:
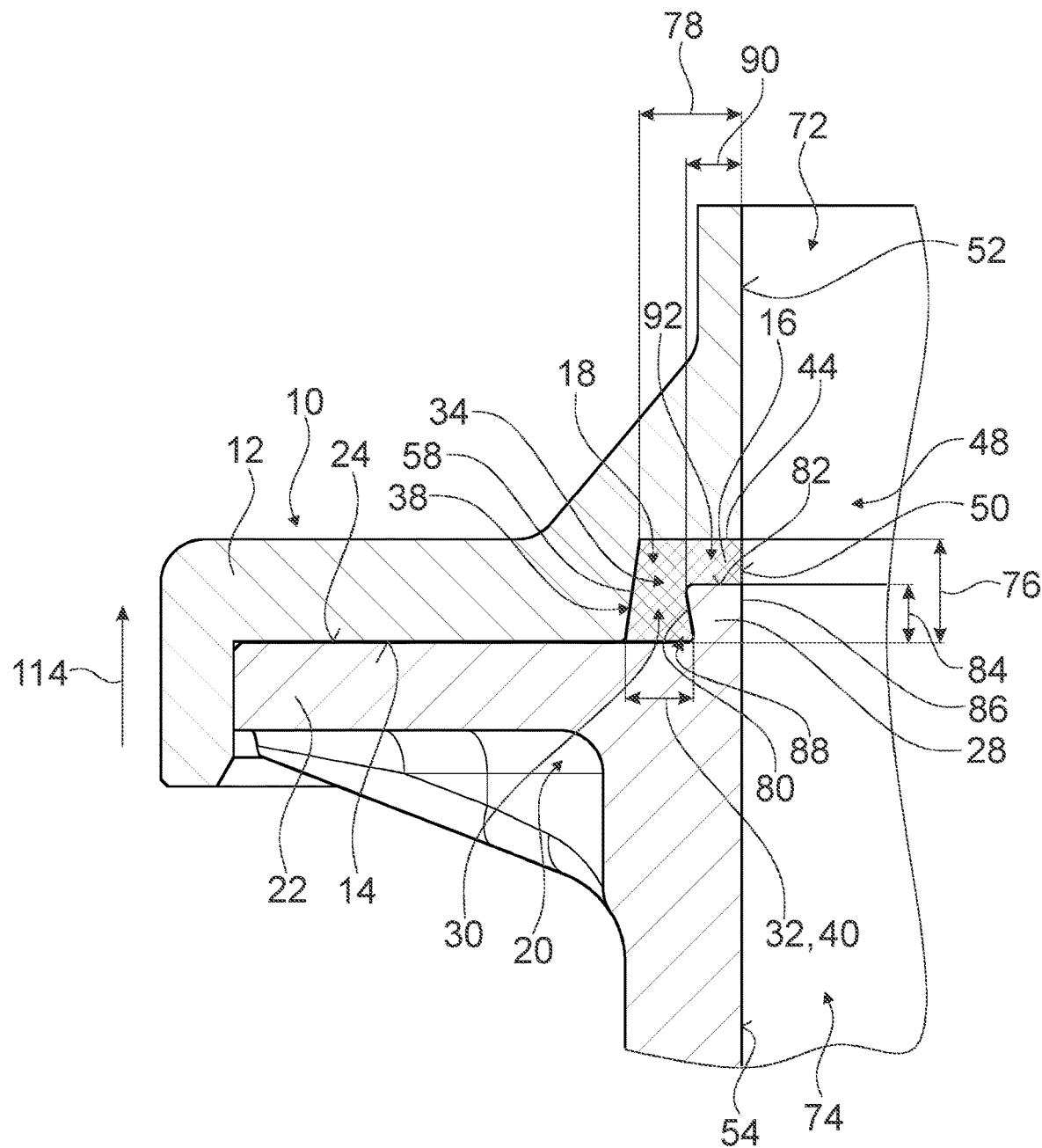
Figure 4:
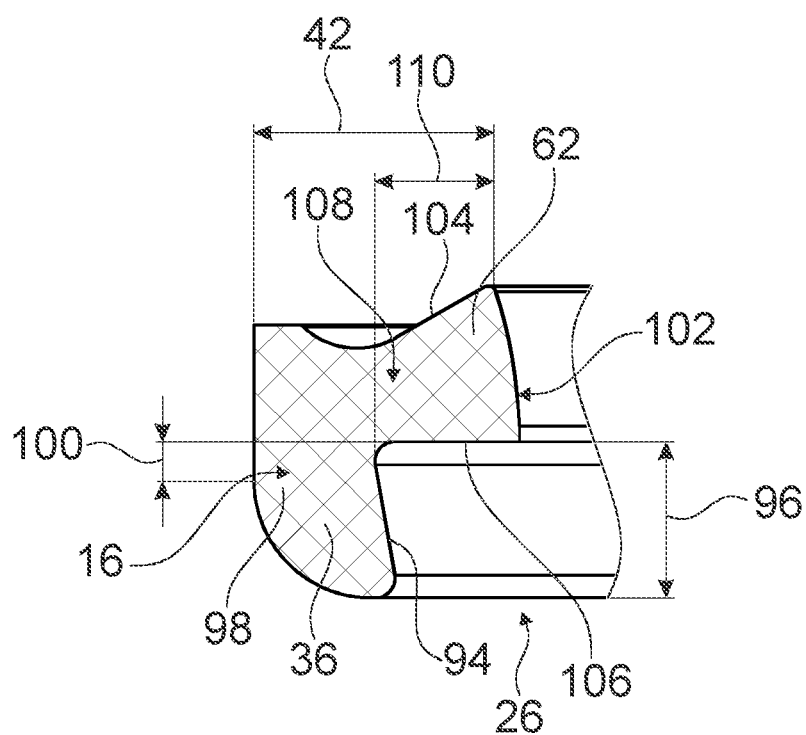

In the drawings:

FIG. 1 shows a schematic exploded illustration of a device for receiving and/or conducting bulk materials with a flange connection device, FIG. 2 shows a schematic, vertical sectional view through the flange connection device in mounted state, FIG. 3 shows an enlargement of part of the vertical sectional view, shown in FIG. 2, through the flange connection device in a connection region, and FIG. 4 shows a schematic, vertical sectional view of a sealing element of the flange connection device.

DESCRIPTION OF THE EXEMPLARY EMBODIMENT

FIG. 1 shows a schematic exploded illustration of a device for receiving and/or conducting bulk materials and/or powders. The device has a flange connection device 112. The device is embodied for example as a dosing apparatus for animal feeds, chemical or pharmaceutical products. Alternatively, the flange connection device 112 may evidently also be used in other devices for receiving and/or conducting bulk materials and/or powders.

The flange connection device 112 has a flange 10. The flange connection device 112 has a further flange 20. The further flange 20 is connected for example as one piece to a trough of the device for receiving and/or conducting bulk materials and/or powders. The flange 10 and the further flange 20 are configured to be mounted against one another. The flange 10 and the further flange 20 for this have for example mounting recesses 64, 66 which allow the flanges 10, 20 to be bolted together. Alternatively, the flanges 10, 20 may be mounted by directly screwing together threads cut into the flanges 10, 20. The flange connection device 112 has a sealing element 16. The sealing element 16 forms a seal. The sealing element 16 in mounted state is arranged between the flanges 10, 20. The sealing element 16 is elastically deformable. In mounted state, the sealing element 16 is elastically deformed. In mounted state, the sealing element 16 is compressed between the flanges 10, 20. The sealing element 16 is configured to create a particle-tight connection of the flanges 10, 20. The flanges 10, 20 shown in FIG. 1 are round. Alternative flange forms are however conceivable. The sealing element 16 closes a transition from the flange 10 to the further flange 20 in cylindrical to concave form. Thus the connection of the flanges 10, 20 can advantageously be used for a dry and/or wet cleaning process to EHEDG Guidelines for a CIP process and/or to EHEDG Guidelines for a SIP process.

FIG. 2 shows a schematic, vertical sectional view through the flange connection device 112 in mounted state. The flange 10 is connected to the further flange 20. The flange 10 has a base body 12. The base body 12 forms a main contact face 14. The further flange 20 has a further base body 22. The further base body 22 forms a further main contact face 24. The main contact faces 14, 24 of the flanges 10, 20 in mounted state lie against one another in touch contact. The main contact faces 14, 24 of the flanges 10, 20 are each formed as flat annular discs. The flange 10 has a tab 68 at a radially outer end adjoining the main contact face 14. The tab 68 overlaps a radially outer end of the further flange 20 in the radial direction 70. Alternatively, the radially outer ends of the two flanges 10, 20 may terminate flush with one another. The flange connection device 112 forms an interior space 48. The flange connection device 112 seals the interior space 48. The interior space 48 is configured as a conduit for a bulk material or powder. In mounted state, the flange 10, sealing element 16 and further flange 20 are connected to one another with no dead space against the interior space 48. The flange 10 forms a partial interior space 72 of the interior space 48. The further flange 20 forms a further partial interior space 74 of the interior space 48. The sealing element 16 seals a connection of the partial interior spaces 72, 74 to one another. The flange 10 has an inner diameter 60 corresponding to DN 200. The further flange 20 has an inner diameter 56 corresponding to DN 200. An inner diameter of the sealing element 16 in compressed state also corresponds to DN 200. The flanges 10, 20 in mounted state have a common center axis 46. In mounted state, the flange 10, the sealing element 16 and the further flange 20, have a same minimum distance from the common center axis 46 in a connecting region of the two flanges 10, 20.

FIG. 3 shows schematically an enlargement of part of the vertical sectional view, shown in FIG. 2, through the flange connection device 112 in the connecting region. The flange 10 has a recess 18. In mounted state, the sealing element 16 is arranged in the recess 18. The recess 18 of the flange 10 adjoins the main contact face 14. The recess 18 runs on the inside as a ring around the main contact face 14. The recess 18 is arranged on a side of the main contact face 14 facing the partial interior space 72. The recess 18 has a bottom 44. The bottom 44 is flat. A surface of the bottom 44 runs parallel to the main contact face 14 of the flange 10. The recess 18 forms a flank 38 of the base body 12 of the flange 10. The recess 18 has a side wall 58. The side wall 58 delimits the recess 18 in a direction pointing away from the partial interior space 72. The side wall 58 is angled to an inner face 52 of the flange 10. The side wall 58 is angled to a vertical 114. The angle of the side wall 58 serves to support the self-centering via the sealing element 16/of the sealing element 16. The side wall 58 and the bottom 44 span an angle of more than 90°, e.g. around 92° or around 95°. The recess 18 has a depth 76 of around 7 mm. The recess 18 as an (annular) width 78 of around 7 mm.

The further flange 20 has an extension 28. The extension 28 of the further flange 20 protrudes from the further base body 22. The extension 28 of the further flange 20 protrudes from the further base body 22 at the further main contact face 24. The extension 28 is formed as an annular protrusion. The extension 28 adjoins the further main contact face 24. The extension 28 engages in the recess 18 in mounted state. The extension 28 is configured for positioning of the sealing element 16. The extension 28 is configured for centering of the sealing element 16. The extension 28 is configured for defined compression of the sealing element 16. The extension 28 has a first side wall 80. The first side wall 80 of the extension 28 is arranged facing away from the partial interior space 74 of the further flange 20. The first side wall 80 of the extension 28 adjoins the further main contact face 24. The first side wall 80 of the extension 28 is angled relative to a further inner face 54 of the further flange 20. The first side wall 80 of the extension 28 is angled relative to the vertical 114. An angle spanned between the first side wall 80 of the extension 28 and the further main contact face 24 is approximately 80°. An angle spanned between the first side wall 80 of the extension 28 and the vertical 114/an extension of the further inner face 54 of the further flange 20 is around 10°. The angle of the first side wall 80 of the extension 28 of the further flange 20 creates a concave receiving space 88 for the sealing element 16. The extension 28 has a surface 82 which in mounted state faces the flange 10. The surface 82 of the extension 28 is level and/or flat. The extension 28 has a second side wall 86. The second side wall 86 of the extension 28 is arranged facing the partial interior space 74 of the further flange 20. The second side wall 86 of the extension 28 faces away from the further main contact face 24. The second side wall 86 of the extension 28 forms an extension of the further inner face 54 of the further flange 20. The second side wall 86 of the extension 28 runs parallel to the vertical 114. The second side wall 86 of the extension 28 runs parallel to the further inner face 54 of the further flange 20. The extension 28 has a height 84. The height 84 of the extension 28 of the further flange 20 is smaller than the depth 76 of the recess 18 of the flange 10. The height 84 of the extension 28 is around 4 mm. The height 84 is set and/or matched to dimensions of the sealing element 16 such that the defined compression of the sealing element 16 can be achieved. The extension 28 has an (annular) width 90. The width 90 of the extension 28 of the further flange 20 is smaller than the width 78 of the recess 18 of the flange 10. The width 90 at an upper end of the extension 28 of the further flange 20 is around 3.9 mm. Evidently, the arrangement of recess 18 and extension 28 between the flanges 10, 20 may also be reversed.

The flange 10 and the further flange 20 together delimit a groove 30. The groove 30 forms part of the recess 18. The groove 30 is configured to partially receive the sealing element 16. The groove 30 has a groove width 32. The groove width 32 varies. The groove width 32 of the groove 30 increases starting from an opening 34 of the groove 30 to a low point of the groove 30. The flank 38 extends from the main contact face 14 of the flange 10 into the groove 30. A maximal axial extent 40 of the flank 38 is greater than a maximal axial extent 42 of the uncompressed sealing element 16 (see FIG. 4), in particular in the same spatial direction. The flange 10 and the further flange 20 together delimit a channel 92. The channel 92 forms part of the recess 18. The channel 92 adjoins the opening 34 of the groove 30. The channel 92 connects the groove 30 to the interior space 48 of the flange connection device 112. The channel 92 is configured to partially receive the sealing element 16. The sealing element 16 in mounted state forms an inner face 50 facing the interior space 48. The inner face 50 of the sealing element 16 in mounted state is arranged flush with the inner face 52 of the flange 10. The inner face 50 of the sealing element 16 in mounted state is arranged flush with the further inner face 54 of the further flange 20.

FIG. 4 shows a schematic, vertical sectional view of the sealing element 16. The sealing element 16 has an L-shaped cross-section 26. The L-shaped cross-section 26 of the sealing element 16 comprises a leg 36. The leg 36 is configured to engage by form-fit in the groove 30. The sealing element 16 is configured to be arranged self-retainingly in the groove 30 by means of the leg 36. A minimal inner diameter (not shown) of the loose sealing element 16 is smaller than a maximal outer diameter (not shown) of the extension 28 of the further flange 20. The leg 36 of the sealing element 16 is formed flat on a side 94 facing the interior space 48 in mounted state. The side 94 of the leg 36 of the sealing element 16 facing the interior space 48 in mounted state is angled so as to bend inwards relative to a vertical 114. The leg 36 on the side 94 facing the interior space 48 in mounted state has a length 96 of around 4 mm in uncompressed state. The leg 36 on a side 98 facing away from the interior space 48 in mounted state has a greatly rounded edge. A length 100 of the side 98 of the leg 36 facing away the interior space 48 up to the start of the rounding is substantially shorter than 4 mm.

The L-shaped cross-section 26 of the sealing element 16 comprises a further leg 62. The further leg 62 is configured to engage in the channel 92. The sealing element 16 is configured to create the defined compression by means of the further leg 62. The further leg 62 and the leg 36 span an angle of around 80°. The further leg 62 widens starting from a foot 108 of the further leg 62 towards an end 102 of the further leg 62. The (widened) end 102 of the further leg 62 in mounted state faces the interior space 48. The further leg 36 of the sealing element 16 is formed flat on both sides 104, 106 facing the respective flanges 10, 20. The two sides 104, 106 facing the respective flanges 10, 20 and facing away from one another together span an angle of around 30° in uncompressed state. A length 110 of the further leg 62 from the end 102 to the foot 108 is around 3.6 mm.

The invention claimed is:

1. A device for receiving and/or conducting bulk materials and/or powders, comprising:
   a flange connection device with a flange comprising a base body with a main contact face; and
   a further flange comprising a further base body with a further main contact face; and
   a sealing element,
   wherein in a mounted state the flange is connected to the further flange,
   wherein the main contact face of the flange and the further main contact face of the further flange lie against one another in touch contact in the mounted state,
   wherein the sealing element, in the mounted state, is arranged between the flange and the further flange,
   wherein the flange has a recess which adjoins the main contact face and in which the sealing element is at least partially arranged when in the mounted state,
   wherein the recess has a flat bottom,
   wherein the flange connection device forms an interior space,
   wherein the flange forms a partial interior space of the interior space,
   wherein the recess has a recess side wall delimiting the recess in a direction pointing away from the partial interior space defined by the flange,
   wherein the recess side wall is angled to a vertical,
   wherein the recess side wall and the flat bottom span an angle of more than 90°,
   wherein the further flange has an extension which protrudes from the further base body at the further main contact face and in the mounted state engages at least partially in the recess and in the mounted state contacts the sealing element,
   wherein the flange defines the partial interior space configured as a conduit for the bulk materials and/or powders,
   wherein the extension has an extension side wall which is arranged facing away from the partial interior space of the further flange, wherein the extension side wall adjoins the further main contact face and is angled relative to a further inner face of the further flange,
   wherein an angle spanned between the extension side wall and the further main contact face is approximately 80°,
   wherein the extension is configured for positioning and centering of the sealing element and/or for defined compression of the sealing element,
   wherein the flange and the further flange jointly delimit a groove which forms part of the recess and is configured to partially receive the sealing element,
   wherein a groove width of the groove increases starting from an opening of the groove as far as a low point of the groove,
   wherein the sealing element in the mounted state forms an inner face facing the interior space, and
   wherein the inner face of the sealing element in the mounted state is arranged flush with the inner face of the flange and flush with the further inner face of the further flange.

2. The device as claimed in claim 1, wherein the sealing element has a leg which is configured to engage by form-fit in the groove, wherein the sealing element is configured to be arranged self-retainingly in the groove by means of the leg.

3. The device as claimed in claim 1, wherein the flange, the sealing element and the further flange in the mounted state have a same minimum distance from a common center axis.

4. The device as claimed in claim 1, comprising
   an interior space which is configured as a conduit for the bulk material and/or the powder,
   wherein the partial interior space forms part of the interior space, wherein the flange, the sealing element and the further flange in the mounted state are connected to one another with no dead space against the interior space.

5. The device as claimed in claim 1, wherein an inner face of the sealing element in the mounted state is arranged flush with a cylindrical inner face of the flange and with a further, in particular cylindrical, inner face of the further flange.

6. The device as claimed in claim 1, wherein the main contact face and the further main contact face contact one another in the mounted state.

7. The device as claimed in claim 1, wherein the extension side wall is angled relative to a further inner face of the further flange.

\* \* \* \* \*